United States Patent [19]

Oriseh et al.

[11] Patent Number: 6,080,473
[45] Date of Patent: Jun. 27, 2000

[54] ABS SUBSTRATE EXTRUSION PROCESS

[75] Inventors: Anthony S. Oriseh, Belton; Mark T. Krejchi; Robson M. Mafoti, both of Temple; Ross Michael Mahan, Belton; Yein Ming Lee; Peter C. Gaa, both of Temple, all of Tex.

[73] Assignee: Premark RWP Holdings, Inc., Wilmington, Del.

[21] Appl. No.: 09/270,777

[22] Filed: Mar. 17, 1999

[51] Int. Cl.⁷ ........................................................ B32B 3/26
[52] U.S. Cl. .................... 428/322.2; 428/317.1; 428/317.7; 428/327; 428/337; 428/339; 428/500; 428/515; 428/520; 428/522; 428/903.3; 428/913.3
[58] Field of Search .............................. 428/317.1, 317.7, 428/322.2, 327, 337, 339, 500, 515, 520, 522, 903.3, 913.3

[56] References Cited

U.S. PATENT DOCUMENTS

| | | | |
|---|---|---|---|
| 4,467,969 | 8/1984 | Godfrey et al. | 241/101.4 X |
| 4,478,903 | 10/1984 | Kishida et al. | 428/216 |
| 5,225,137 | 7/1993 | Sadr | 264/349 |
| 5,328,104 | 7/1994 | Lima et al. | 241/24 |
| 5,482,216 | 1/1996 | Hess | 241/23 |
| 5,566,889 | 10/1996 | Preiss | 241/19 |
| 5,653,867 | 8/1997 | Jody et al. | 241/24.18 X |
| 5,667,151 | 9/1997 | Miura et al. | 241/20 |

FOREIGN PATENT DOCUMENTS

| | | |
|---|---|---|
| 27 57 153 | 8/1978 | Germany . |
| 57-074112 | 5/1982 | Japan . |

*Primary Examiner*—Helen L. Pezzuto
*Attorney, Agent, or Firm*—Aquilino, Welsh & Flaxman

[57] ABSTRACT

The process for manufacturing extruded ABS products includes recycling used ABS to produce a recycled ABS exhibiting predetermined characteristics and extruding the recycled ABS to produce an ABS product.

10 Claims, 3 Drawing Sheets

ABS SUBSTRATE EXTRUSION PROCESS

BACKGROUND OF THE INVENTION

1. Field of the Invention

The invention relates to extrusion processes. More particularly, the invention relates to processes for extruding a recycled poly(acrylonitrile-c-butadiene-c-styrene) (ABS) substrate and a multilayer product manufactured therefrom.

2. Description of the Prior Art

Decorative laminates are found in many areas of our lives. This allows individuals to replicate different decorative surfaces without incurring the expense of using the real product. They may take the form of flooring, furniture and countertops, as well as a variety of other structural components too numerous to mention. For example, wood decorative laminates have replaced solid wood in the construction of much furniture. Wood decorative laminates have also replaced solid wood in the construction of hardwood floors.

Decorative laminates are commonly manufactured by applying a decorative surfacing layer to a substrate. In the case of countertops, furniture and replicated hardwood flooring, the decorative surfacing layer is commonly bonded to a particle board substrate. Particle board has found wide use in the production of decorative laminates based upon its rigidity and cost.

Unfortunately, particle board is not a perfect substrate. The use of particle board in the production of decorative laminates has numerous limitations which limit the applications and conditions under which decorative laminates may be employed. For example, particle board decorative laminates are generally not well suited for environments where the laminate will continuously be in contact with water or humidity. As those of skill in the art certainly appreciate, particle board decorative laminates placed in wet environments are highly susceptible to warping, shrinkage, and separation between the decorative surfacing layer and the particle board substrate.

Attempts have been made to find an acceptable replacement for the use of particle board in the production of decorative laminates. However, each replacement has been met with limited success. Either the decorative laminates are prohibitively expensive or the laminates do not exhibit the strength and hardness characteristics demonstrated by particle board.

Foamed ABS substrates have been found effective in overcoming the limitations of traditional particle board substrates. However, foamed ABS manufactured from new ABS is far more expensive than particle board when used in the manufacture of decorative laminates, and is, therefore, not commonly used within the industry.

Existing recycling processes require that the plastics be identified and separated based upon their specific composition (for example, by coding as commonly found on many products sold today) before they may be fully recycled fore subsequent use. Where the commingled plastics are not separated prior to subsequent recycling steps, the net result of recycling these products using existing techniques is the production of substantially useless commingled recycled plastic.

Where the recycled goods are composed of a single plastic component (for example, plastic soda and milk containers), recycling is highly cost effective and leads to many useful products. However, the need for separating the assortment of plastic components prior to shredding and granulating makes recycling commingled plastic products highly time consuming and prohibitively expensive. Existing recycling techniques are, therefore, not appropriate where the recycled goods include many components composed of various plastics.

For example, where it is desired to recycle the plastic components of a computer housing (which is primarily composed of ABS, PCABS, and other plastics), the computer housing must first be separated into various components representing the many plastics used in the construction of the computer housing. This is highly time consuming, and makes recycling computer housings cost prohibitive. Such limitations are commonly found with ABS products one might consider appropriate for recycling.

As such, a decorative laminate substrate material is needed which overcomes the shortcomings of the prior decorative laminate substrate and particle board based decorative laminates. The present invention provides such a decorative laminate substrate as well as a decorative laminate made with the substrate.

SUMMARY OF THE INVENTION

It is, therefore, an object of the present invention to provide a process for the manufacture of extruded ABS products. The process includes recycling used ABS to produce a recycled ABS exhibiting predetermined characteristics and extruding the recycled ABS to produce an ABS product.

It is also an object of the present invention to provide a process wherein the recycled ABS is extruded to produce an ABS sheet.

It is another object of the present invention to provide a process including the step of applying a decorative surfacing layer to the ABS sheet to create a laminated composite.

It is a further object of the present invention to provide a process wherein the decorative surfacing layer is an acrylic.

It is also an object of the present invention to provide a process wherein the decorative laminate is a flooring product.

It is another object of the present invention to provide a process wherein the decorative surfacing layer is applied using urethane glue and corona plasma treatment.

It is a further object of the present invention to provide a process wherein the step of extruding includes free foaming the recycled ABS.

It is also an object of the present invention to provide a process wherein the free foaming occurs as the extruded ABS exits an extrusion die.

It is another object of the present invention to provide a process wherein the recycled ABS is cooled after free foaming.

It is a further object of the present invention to provide a process wherein the recycled ABS is extruded at a temperature ranging from approximately 220° F. to 400° F.

It is also an object of the present invention to provide an extruded ABS product manufactured in accordance with the process described above.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

A process for the manufacture of an ABS substrate is disclosed. Briefly, the ABS substrate is extruded using recycled ABS manufactured in accordance with the commonly owned process disclosed and claimed in the U.S. Patent Application entitled "ABS Recycling Process", filed Mar. 17, 1999, which is incorporated herein by reference.

Figure 1:
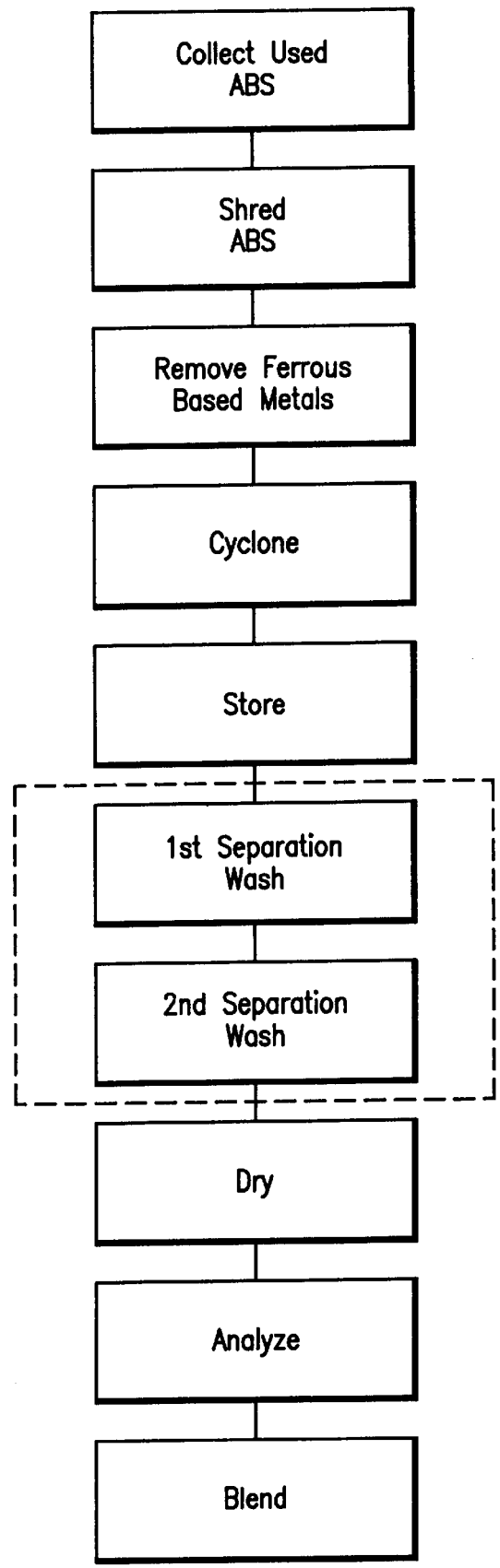
FIG. 1 is a flow chart of the recycling process used in accordance with the present invention.

With reference to FIG. 1, the recycling process is disclosed. Briefly, the process employs shredding, separation and blending of commingled plastics to produce recycled ABS and polycarbonate acrylonitrile-c-butadiene-c-styrene ("PCABS") useful in the manufacture of new products. The present recycling process employs a series of steps to remove undesirable components. The removed undesirable components include, but are not limited to, metals, resins, foams, thermosets, rubbers, and foils, which, if included in the recycled product would prevent subsequent use of the recycled product. Any of these undesirable components would contaminate the recycled product and prevent further processing of the recycled product, for example, by extrusion.

Those skilled in the art will readily appreciate the fact that the computer housings recycled in accordance with the preferred embodiment of the present invention included substantial amounts of both ABS and PCABS, as well as a variety of other commingled plastics (for example, polyphenyloxides and polystyrenes). Such computer housings are the primary used source for recycled plastic in accordance with the preferred embodiment of the present. While it is commonly understood that housings such as those used in accordance with the present invention generally include substantial quantities of PCABS, for the sake of simplicity when the generic term ABS is used alone within the remainder of the specification, it should be understood to refer to plastics which may include ABS alone, commingle ABS/PCABS and other useful plastics, or PCABS alone.

Recycled ABS has found particular usefulness in the manufacture of substrates for decorative laminates. For example, commonly owned U.S. patent application Ser. No. 09/173,065, entitled "Laminate", filed Oct. 16, 1998, which is incorporated herein by reference, and Ser. No. 09/179,448, entitled "Foam Core Countertop Profile Extrusion System", filed Oct. 27, 1998, which is incorporated herein by reference disclose the use of recycled ABS in the manufacture of decorative laminates.

At the present time, new ABS may be purchased for approximately $0.65 per pound. While this price is acceptable for the manufacture of various products, it is prohibitively expensive for the manufacture of other products not requiring the characteristics provided by new, pure ABS. The present process may be employed to manufacture recycled ABS/PCABS (which may be used in the manufacture of the products discussed above) at a cost of approximately $0.20 per pound, placing it well within the range of many products that must be manufactured at a lower cost to make them competitive within their specific markets.

Figure 2:
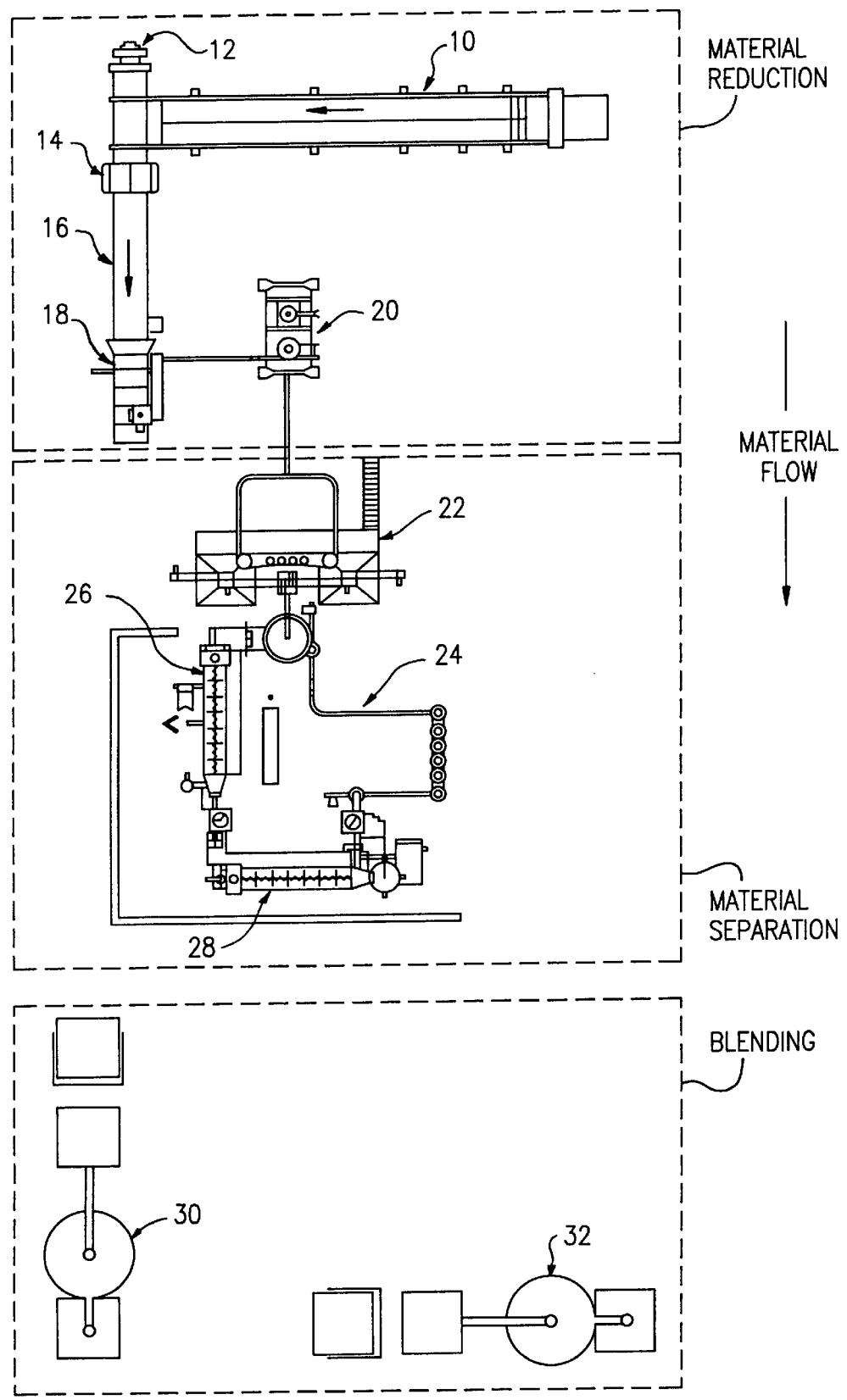
FIG. 2 is a schematic showing the present recycling process.

In accordance with the present invention, and with reference to FIGS. 1 and 2, discarded ABS is first collected from a variety of sources. For example, outdated computer housings and other electronic equipment housings are commonly discarded after their useful life has been reached. As such, used ABS is readily available from various ABS providers at a reasonable cost. While electronic housings are used in accordance with the preferred embodiment of the present invention, it should be understood that other ABS sources may be employed without departing from the spirit of the present invention. As discussed above, it should be understood that the collected products are not generally composed of simple ABS. These products are generally composed of ABS and PCABS, as well as smaller quantities of plastics such as polyphenoloxide, polystyrene, etc.

Once the used ABS is collected, the ABS products from a single ABS provider are set on a conveyor 10 and moved to a shredder 12. The shredded product is then passes to a fixed magnet 14, for example, a belt magnet, where ferrous based metals are removed from the shredded product. Preferably, the products are shredded using a Saturn Shredder, although other shredders, for example, Hammermill, may be used without departing from the spirit of the present invention.

The shredded ABS is then carried by a granulator infeed conveyor 16 to a granulator 18, where the shredded ABS is granulated to a size of approximately ⅜". The granulated ABS is then placed within a cyclone 20 to remove various contaminants from the ABS. For example, paper, debris and fines are removed by treating the granulated ABS within the cyclone 20. The treated ABS is then stored in storage silos 22 where it awaits further treatment.

Although metals are previously removed from the ABS products in accordance with the ferrous-based metal removal step, metals and undesirable plastics are often found integrally formed with the ABS products. The granulated ABS is, therefore, treated with a dual separation wash 24 designed to remove any remaining metals and undesirable plastics maintained in the ABS being processed. The dual separation wash 24 is a continuous process.

Specifically, the granulated ABS is washed in a first separation wash tank 26 filled with a fluid having a specific gravity of approximately 1.23 $g/cm^3$ to approximately 1.25 $g/cm^3$. The preferred fluid is $H_2O$ and $CaCl_2$ mixed to create a desired specific gravity. At a specific gravity of approximately 1.23 $g/cm^3$–1.25 $g/cm^3$, the metals and heavier plastics mixed with the ABS will sink to the bottom of the first separation wash tank 26 where they are withdrawn and discarded. In this way, the granulated material is substantially freed from undesirable metals and plastics.

The useful granulated ABS is continuously taken from the top of the first separation wash tank 26 and passed to a second separation wash tank 28. The second separation wash tank 28 is used to separate the desirable plastics from the undesirable plastics. The desirable and undesirable plastics may be readily separated by taking advantage of the different densities of the plastics to achieve an effective separation. As such, the second separation wash tank 28 is provided with a fluid having a specific gravity of approximately 1.00 $g/cm^3$. At a specific gravity of 1.00 $g/cm^3$ the desirable ABS sinks to the bottom of the tank and undesirable plastics float at the top of the tank. The desirable ABS which sinks to the bottom of the tank is withdrawn from the bottom of the tank, while the undesirable plastics are skimmed from the top of the tank and discarded.

The dual wash separation technique discussed above may be varied, for example, the specific gravities employed could be altered, to process other materials, without departing from the spirit of the present invention.

At this point, the collected ABS is placed in a gaylord and permitted to dry. The collection of recycled ABS from a single ABS provider is then completed. Used ABS from other providers is then processed in the manner discussed above. However, the material composition of ABS used by different ABS providers varies from provider to provider. Since the recycled ABS ultimately collected from each ABS provider may not be exactly what is desired for a specific application, the processed ABS collected from each ABS provider is gathered, homogenized within a homogenizing blender 30 and analyzed to determine its specific material composition (that is, its mechanical and physical characteristics).

Once recycled ABS from various ABS providers is collected, homogenized and analyzed, the recycled ABS is blended within a formulation blender 32 and analyzed to produce an ABS composition desired for the specific application to which the recycled ABS is destined. For example, the tensile strength, impact resistance, ash content, polycarbonate content, etc. of the recycled ABS is considered in preparing the ideal composition for various applications.

In accordance with the preferred embodiment of the present invention, blending is achieved using standard equipment available in the marketplace, and various blending techniques and apparatuses may be used without departing from the spirit of the present invention. The compositional analysis is achieved using conventional techniques well known throughout the industry.

The resulting recycled ABS is substantially shredded pellet shaped and is sized for conventional use in the production of ABS products.

Figure 3:
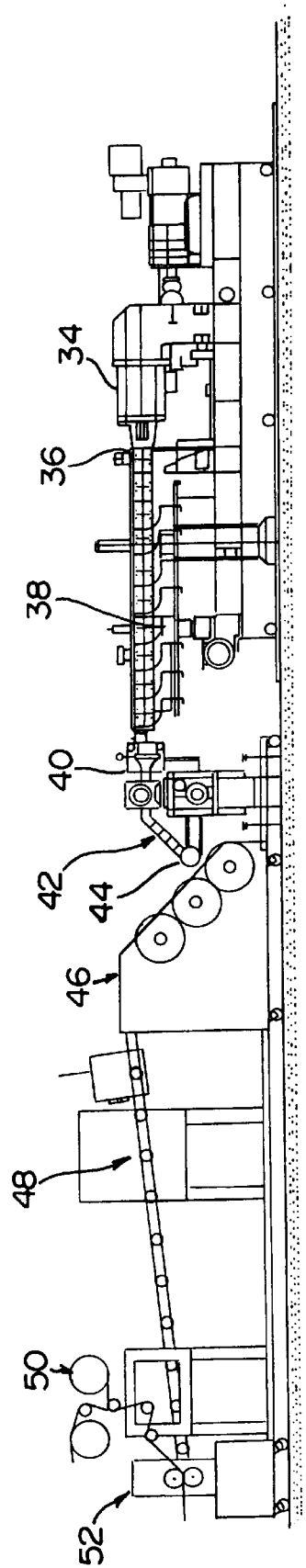
FIG. 3 is a schematic of the present extrusion system.

Once the recycled ABS is properly blended to achieve a desired composition, the recycled ABS is extruded. With reference to FIG. 3, the recycled ABS is first deposited within an extruder 34. A single screw compounding extruder, twin screw extruder, or other appropriate extruders may be used without departing from the spirit of the present invention. In accordance with the preferred embodiment of the present invention, a single screw compounding extruder is used The extruder includes a main feed port 36, a first side stuffer 38 in which $CaC_3$ is added to the extruded product. In accordance with the preferred embodiment of the present invention, approximately 25% to approximately 45% $CaC_3$ and, more preferably, approximately 35% $CaC_3$ is added to the recycled ABS being extruded.

The extruder 34 also includes various cooling passages through which fluid is circulated to ensure that the material passing through the extruder 34 is maintained at a desired temperature. While a preferred extruder is disclosed in accordance with the present invention, those of ordinary skill in the art will appreciate that various extruders may be used without departing from the spirit of the present invention.

After passing though the extruder 34, the recycled ABS is filtered through a screen changer filter 40. The filter 40 functions to remove undesirable components from the recycled ABS before further processing. The screen changer filter 40 is manufactured by Y. M. Lee, although other filters and screen changers maybe employed without departing from the spirit of the present invention. After being filtered, the recycled ABS is pumped through a static mixer 42.

The fully mixed recycled ABS then passes through a sheet extrusion die 44. The dimensions of the recycled ABS exiting the extrusion die 44 are preferably approximately 49" (124.46 cm) wide and .400" (0.216 cm) thick. While a sheet extrusion die with the disclosed dimensions is used in accordance with the preferred embodiment of the present invention, sheets of other shapes and dimensions may be manufactured without departing from the spirit of the present invention.

Upon exiting the extrusion die 44, the extruded ABS sheet is permitted to free foam. The extruded ABS sheet is then cooled and smoothed using a wide roller stack 46 manufactured by Y.M. Lee. The wide roller stack 46 also gauges the extruded ABS sheet to a thickness of approximately .235" (0.597 cm). The thickness of the sheet is reduced with limited draw down to prevent changes in the orientation of the foamed ABS.

The ABS sheet finally enters the cooling assembly 48, masking station 50 and pull rollers 52. As those skilled in the art will appreciate, the extrusion line employed in accordance with the preferred embodiment of the present invention is a substantially conventional design and may be varied to suit particular needs without departing from the spirit of the present invention. While specific manufacturers and models have been discussed above with reference to the preferred embodiment of the present invention, other manufacturer's equipment may be employed without departing from the spirit of the present invention.

The entire extrusion line is controlled by a series of automated control units. For example, the controls for the extrusion line include, but are not limited to, a drive panel extruder, panel extruder auxiliary, extruder heat panel, gear pump panel, communication panel, PLC control panel and thickness gauge control panel. The controls are conventional within the art and a variety of different control techniques may be employed without departing from the spirit of the present invention.

Since the present extrusion process is carried out using recycled ABS, the heat characteristics are varied from conventional practice, somewhat, to suit the specific properties of the recycled ABS. As such, the recycled ABS is extruded along a thermal profile ranging from approximately 220° F. (104° C.)–320° F. (160° C.) within the extruder, approximately 350° F. (177° C.) within the adapter, and approximately 350° F. (177° C.)–400° F. (204° C.) within the die. Specifically, and in accordance with the preferred embodiment of the present invention, the single screw extruder includes six zones set at approximately 220° F. (104° C.), 250° F. (121° C.), 300° F. (149° C.), 300° F. (149° C.), 320° F. (160° C.), and 300° F. (149° C.) as the extruder extends from its proximal end to its distal end. As to the die body, it is set with an internal temperature of approximately 350° F. (177° C.) and an edge temperature of approximately 400° F. (204° C.).

As those skilled in the art will readily appreciate, the temperature profiles discussed above are substantially below those employed within the industry. The reduced temperatures are dictated by the temperature sensitivity of the recycled ABS to which blowing agents are added. The added blowing agents are added to the ABS to enhance foaming. In addition, the lower temperatures are dictated by the higher melt flow exhibited by the recycled ABS (extrusion grade ABS commonly exhibits a melt flow index of approximately 5, while the recycled ABS exhibits a melt flow index in the 20s).

Once an appropriate ABS substrate is extruded, the decorative surfacing material is secured thereto. In accordance with the present invention, a wide variety of decorative surfacing materials may be bonded to the ABS substrate. For example, the ABS substrate may be employed with the flooring products disclosed in commonly owned U.S. patent application Ser. No. 09/173,065, entitled "Laminate", which has been previously mentioned.

The decorative surfacing material is preferably bonded to the ABS substrate using urethane glue in combination with corona plasma treatment. However, other bonding techniques may be used without departing from the spirit of the present invention.

Decorative laminates made in accordance with the present invention are particularly suited for use as flooring materials due to the water resistant characteristics of the ABS substrate material. In addition, the hardness characteristics of the ABS substrate make it ideal for use in the manufacture of decorative laminate flooring materials.

While the preferred embodiment has been shown and described, it will be understood that there is no intent to limit the invention by such disclosure, but rather, is intended to cover all modifications and alternate constructions falling within the spirit and scope of the invention as defined in the appended claims.

What is claimed is:

1. A process for the manufacture of extruded ABS products, comprising the following steps:

recycling used ABS to produce a recycled ABS exhibiting predetermined characteristics;

extruding the recycled ABS to produce an ABS product, wherein the step of extrusion includes forcing the recycled ABS through an extruder having a thermal profile from approximately 220° F. to approximately 320° F.

2. The process according to claim 1, wherein the recycled ABS is extruded to produce an ABS sheet.

3. The process according to claim 2, further including the step of applying a decorative surfacing layer to the ABS sheet to create a laminated composite.

4. The process according to claim 3, wherein the decorative surfacing layer is an acrylic.

5. The process according to claim 3, wherein the decorative laminate is a flooring product.

6. The process according to claim 3, wherein the decorative surfacing layer is applied using urethane glue and corona plasma treatment.

7. The process according to claim 1, wherein the step of extruding includes free foaming the recycled ABS.

8. The process according to claim 6, wherein the free foaming occurs as the extruded ABS exits an extrusion die.

9. The process according to claim 6, wherein the recycled ABS is cooled after free foaming.

10. The process according to claim 1, wherein the recycled ABS is processed at a temperature ranging from approximately 220° F. to 400° F.

* * * * *